(12) United States Patent
Miyoshi et al.

(10) Patent No.: US 8,490,385 B2
(45) Date of Patent: Jul. 23, 2013

(54) CATALYST DETERIORATION DIAGNOSIS SYSTEM AND METHOD FOR INTERNAL COMBUSTION ENGINE

(75) Inventors: Yuji Miyoshi, Susono (JP); Hiroshi Sawada, Gotenba (JP); Daisuke Shibata, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 311 days.

(21) Appl. No.: 13/055,062

(22) PCT Filed: Jul. 22, 2009

(86) PCT No.: PCT/IB2009/006315
§ 371 (c)(1),
(2), (4) Date: Jan. 20, 2011

(87) PCT Pub. No.: WO2010/010448
PCT Pub. Date: Jan. 28, 2010

(65) Prior Publication Data
US 2011/0126517 A1 Jun. 2, 2011

(30) Foreign Application Priority Data
Jul. 25, 2008 (JP) ................... 2008-192640

(51) Int. Cl.
*F01N 3/00* (2006.01)
*F01N 3/10* (2006.01)
(52) U.S. Cl.
USPC ............... 60/277; 60/286; 60/299; 60/300; 60/303
(58) Field of Classification Search
USPC ............... 60/274, 277, 285, 286, 295, 299, 60/300, 303
See application file for complete search history.

(56) References Cited

U.S. PATENT DOCUMENTS
2009/0044517 A1 2/2009 Oba

FOREIGN PATENT DOCUMENTS

| | | |
|---|---|---|
| CN | 101208505 A | 6/2008 |
| EP | 1 882 840 A1 | 1/2008 |
| EP | 1 900 928 A1 | 3/2008 |
| JP | A-2004-324477 | 11/2004 |
| JP | A-2004-353606 | 12/2004 |
| JP | A-2005-307745 | 11/2005 |
| JP | A-2006-161718 | 6/2006 |
| JP | A-2007-138898 | 6/2007 |
| JP | A-2008-38742 | 2/2008 |
| WO | WO 2008/150014 A1 | 12/2008 |

OTHER PUBLICATIONS

International Search Report dated Dec. 3, 2009 in corresponding International Application No. PCT/IB2009/006315.
Written Opinion of the International Searching Authority dated Dec. 3, 2009 in corresponding International Application No. PCT/IB2009/006315.
International Preliminary Report on Patentability dated Oct. 26, 2010 in corresponding International Application No. PCT/IB2009/006315.

*Primary Examiner* — Kenneth Bomberg
*Assistant Examiner* — Audrey K Bradley
(74) *Attorney, Agent, or Firm* — Oliff & Berridge, PLC

(57) ABSTRACT

A catalyst deterioration diagnosis system performs a diagnosis of deterioration of the oxidation catalyst based on a high-temperature-inflow-condition exhaust gas temperature and a low-temperature-inflow-condition exhaust gas temperature. The high-temperature-inflow-condition exhaust gas temperature is a temperature detected by a temperature sensor while the temperature of the exhaust gas that flows into the oxidation catalyst is in a high temperature region H while the reducing agent is supplied from the reducing agent supply means into the exhaust gas that flows into the oxidation catalyst. The low-temperature-inflow-condition exhaust gas temperature is a temperature detected by the temperature sensor while the temperature of the exhaust gas that flows into the oxidation catalyst is in a low temperature region L while the reducing agent is supplied from a reducing agent supply means into the exhaust gas that flows into the oxidation catalyst.

17 Claims, 7 Drawing Sheets

CATALYST DETERIORATION DIAGNOSIS SYSTEM AND METHOD FOR INTERNAL COMBUSTION ENGINE

BACKGROUND OF THE INVENTION

1. Field of the Invention

The invention relates to a catalyst deterioration diagnosis system and method for an internal combustion engine.

2. Description of the Related Art

In general, exhaust systems for internal combustion engines are provided with various exhaust gas purification means, such as oxidation catalysts, NOx storage-reduction catalysts, particulate filters, etc. The components, such as hydrocarbon (HC), carbon monoxide (CO), NOx, particulate matter, contained in the exhaust gas that is discharged from an engine body are removed by such exhaust gas purification means. Of these, the oxidation catalyst is used to remove the unburned HC and CO in the exhaust gas that flows into the exhaust gas purification means.

Because of its property, the oxidation catalyst that oxidizes components contained in exhaust gas, which is catalyst noble metal, such as platinum (Pt), deteriorates and the oxidation capability thereof is reduced when the oxidation catalyst is exposed to high temperature and/or used for a long time. When the oxidation capability is reduced, the unburned HC and CO are less oxidized on the oxidation catalyst.

Thus, it is proposed to detect the degree of deterioration of the oxidation catalyst. For example, there is a catalyst deterioration diagnosis system in which the temperature of the oxidation catalyst is detected by a temperature sensor and that includes: an overheat temperature computing means that computes the overheat temperature that is the temperature of the oxidation catalyst that exceeds a catalyst deterioration determination temperature that is set in advance; an exceeding-time computing and adding-up means that adds up the exceeding time periods that are operating time weighed according to the increase in the detected overheat temperature; and a catalyst deterioration diagnosis means that determines the degree of deterioration of the oxidation catalyst based on the added-up exceeding time period (see Japanese Patent Application Publication No. 2005-307745 (JP-A-2005-307745), for example).

The longer the time period during which the temperature of the oxidation catalyst is equal to or higher than the catalyst deterioration determination temperature is and the higher the overheat temperature that is higher than the catalyst deterioration determination temperature is, the further the oxidation catalyst deteriorates. Thus, the catalyst deterioration diagnosis means determines the degree of deterioration of the oxidation catalyst based on such a time period and/or overheat temperature.

Meanwhile, the oxidation catalyst deteriorates due to not only the thermal deterioration caused by overheating of the oxidation catalyst but also other various causes, such as sulfur poisoning. However, in the catalyst deterioration diagnosis system as described in JP-A-2005-307745, the deterioration of the oxidation catalyst is determined based only on the thermal deterioration caused by overheating of the oxidation catalyst, and therefore, it is difficult to correctly determine the degree of deterioration of the oxidation catalyst when the oxidation catalyst deteriorates due to the causes other than overheating of the oxidation catalyst.

SUMMARY OF THE INVENTION

The invention provides a catalyst deterioration diagnosis system and a catalyst deterioration diagnosis method, with which it is possible to correctly determine the degree of deterioration of an oxidation catalyst regardless of the causes for deterioration of the oxidation catalyst.

A first aspect of the invention is a catalyst deterioration diagnosis system for an exhaust gas purification device including an oxidation catalyst that oxidizes a component of an inflow exhaust gas and a reducing agent supply means that supplies a reducing agent into the exhaust gas that flows into the oxidation catalyst, the catalyst deterioration diagnosis system being characterized by including: an outflow exhaust gas temperature detection means that detects or estimates an outflow exhaust gas temperature, which is the temperature of the exhaust gas that flows out of the oxidation catalyst or the outlet temperature of the oxidation catalyst; and a catalyst deterioration diagnosis means that performs a diagnosis of deterioration of the oxidation catalyst based on the detected value or the estimated value of the outflow exhaust gas temperature output from the outflow exhaust gas temperature detection means, wherein the catalyst deterioration diagnosis means performs the diagnosis of deterioration of the oxidation catalyst based on a high-temperature-inflow-condition exhaust gas temperature and a low-temperature-inflow-condition exhaust gas temperature, the high-temperature-inflow-condition exhaust gas temperature being a temperature detected or estimated by the outflow exhaust gas temperature detection means while an inflow exhaust gas temperature, which is a temperature of the exhaust gas that flows into the oxidation catalyst or the inlet temperature of the oxidation catalyst, is in a high temperature region while the reducing agent is supplied from the reducing agent supply means, the low-temperature-inflow-condition exhaust gas temperature being a temperature detected or estimated by the outflow exhaust gas temperature detection means while the inflow exhaust gas temperature is in a low temperature region, in which the inflow exhaust gas temperature is lower than the inflow exhaust gas temperature in the high temperature region, while the reducing agent is supplied from the reducing agent supply means.

In the above first aspect, the catalyst deterioration diagnosis means may perform the diagnosis of deterioration of the oxidation catalyst based on a difference or a ratio between the high-temperature-inflow-condition exhaust gas temperature and the low-temperature-inflow-condition exhaust gas temperature.

In the above first aspect, the catalyst deterioration diagnosis means may determine that the oxidation catalyst has deteriorated when the difference between the high-temperature-inflow-condition exhaust temperature and the low-temperature-inflow-condition exhaust gas temperature is equal to or greater than a predetermined value or when the ratio of the high-temperature-inflow-condition exhaust gas temperature to the low-temperature-inflow-condition exhaust gas temperature is equal to or higher than a predetermined value.

In the above first aspect, the catalyst deterioration diagnosis means may perform the diagnosis of deterioration of the oxidation catalyst based on a difference or a ratio between a target temperature of the outflow exhaust gas temperature and the high-temperature-inflow-condition exhaust gas temperature and on a difference or a ratio between the target temperature and the low-temperature-inflow-condition exhaust gas temperature.

In the above first aspect, the catalyst deterioration diagnosis means may determine that the oxidation catalyst has deteriorated when the difference or the ratio between the target temperature and the high-temperature-inflow-condition exhaust gas temperature is greater than the difference or the ratio between the target temperature and the low-temperature-inflow-condition exhaust, gas temperature by a predetermined value or more, or when a ratio of the difference or the ratio between the target temperature and the low-temperature-inflow-condition exhaust gas temperature to the difference or the ratio between the target temperature and the high-temperature-inflow-condition exhaust gas temperature is equal to or higher than a predetermined value.

In the above first aspect, the amount of supply of the reducing agent from the reducing agent supply means may be controlled based on the inflow exhaust gas temperature.

In the above first aspect, the amount of supply of the reducing agent from the reducing agent supply means may be controlled based on the inflow exhaust gas temperature and a difference between the target temperature and the outflow exhaust gas temperature.

In the above first aspect, the amount of supply of the reducing agent from the reducing agent supply means may be controlled so that the outflow exhaust gas temperature is brought to the target temperature.

In the above first aspect, a configuration may be adopted in which when the high-temperature-inflow-condition exhaust gas temperature and the low-temperature-inflow-condition exhaust gas temperature are detected or estimated by the outflow exhaust gas temperature detection means, the target temperature is kept constant.

In the above first aspect, a configuration may be adopted in which the catalyst deterioration diagnosis system further includes an inflow exhaust gas temperature control means that controls the inflow exhaust gas temperature, wherein the inflow exhaust gas temperature control means performs a high temperature keeping process for keeping the inflow exhaust gas temperature within the high temperature region and a low temperature keeping process for keeping the inflow exhaust gas temperature within the low temperature region, and when the catalyst deterioration diagnosis means performs the diagnosis of deterioration of the oxidation catalyst, the high temperature keeping process and the low temperature keeping process are consecutively performed.

In the above first aspect, a configuration may be adopted, in which when the catalyst deterioration diagnosis means performs the diagnosis of deterioration of the oxidation catalyst, the low temperature maintaining process is performed after the high temperature keeping process.

In the above first aspect, a configuration may be adopted, in which the inflow exhaust gas temperature control means brings an internal combustion engine that is equipped with the exhaust gas purification device into normal operation as the low temperature keeping process, and when the inflow exhaust gas temperature is not kept within the low temperature region by the normal operation, the inflow exhaust gas temperature control means performs control to reduce a temperature of the exhaust gas that is discharged from an engine body.

In the above first aspect, a configuration may be adopted, in which when the inflow exhaust gas temperature is changed or the amount of supply of the reducing agent from the reducing agent supply means is changed, the catalyst deterioration diagnosis means performs the diagnosis of deterioration of the oxidation catalyst with the use of the temperature detected or estimated by the outflow exhaust gas temperature detection means after the total amount of air taken in since the inflow exhaust gas temperature or the amount of supply of the reducing agent was changed becomes equal to or greater than a reference value.

In the above first aspect, a configuration may be adopted, in which when the inflow exhaust gas temperature is changed or the amount of supply of the reducing agent from the reducing agent supply means is changed, the catalyst deterioration diagnosis means performs the diagnosis of deterioration of the oxidation catalyst with the use of the temperature detected or estimated by the outflow exhaust gas temperature detection means after operating time of an internal combustion engine equipped with the exhaust gas purification device since the inflow exhaust gas temperature or the amount of supply of the reducing agent was changed becomes equal to or greater than a reference time period.

In the above first aspect, a configuration may be adopted, in which when the inflow exhaust gas temperature is changed or the amount of supply of the reducing agent from the reducing agent supply means is changed, the catalyst deterioration diagnosis means performs the diagnosis of deterioration of the oxidation catalyst with the use of the temperature detected or estimated by the outflow exhaust gas temperature detection means after the total amount of fuel and the reducing agent supplied since the inflow exhaust gas temperature or the amount of supply of the reducing agent was changed becomes equal to or greater than a reference amount.

In the above first aspect, a particulate filter may be provided downstream of the oxidation catalyst with respect to exhaust gas flow, and the diagnosis of deterioration of the oxidation catalyst performed by the catalyst deterioration diagnosis means may be performed during a process for regenerating the particulate filter.

In the above first aspect, the oxidation catalyst may be supported by a particulate filter and the diagnosis of deterioration of the oxidation catalyst performed by the catalyst deterioration diagnosis means may be performed during a process for regenerating the particulate filter.

In the above first aspect, the oxidation catalyst may be supported by a carrier along with a NOx storage-reduction substance capable of storing NOx, and the diagnosis of deterioration of the oxidation catalyst performed by the catalyst deterioration diagnosis means may be performed during a process for releasing SOx stored in the NOx storage-reduction substance.

A second aspect of the invention is a catalyst deterioration diagnosis method for an exhaust gas purification device including an oxidation catalyst that oxidizes a component of an inflow exhaust gas and a reducing agent supply means that supplies a reducing agent into the exhaust gas that flows into the oxidation catalyst, the catalyst deterioration diagnosis method being characterized by including: detecting or estimating an outflow exhaust gas temperature, which is a temperature of the exhaust gas that flows out of the oxidation catalyst or an outlet temperature of the oxidation catalyst, while an inflow exhaust gas temperature, which is a temperature of the exhaust gas that flows into the oxidation catalyst or an inlet temperature of the oxidation catalyst, is in a high temperature region while the reducing agent is supplied from the reducing agent supply means; detecting or estimating the outflow exhaust gas temperature while the inflow exhaust gas temperature is in a low temperature region, in which the inflow exhaust gas temperature is lower than the inflow exhaust gas temperature in the high temperature region, while the reducing agent is supplied from the reducing agent supply means; and performing a diagnosis of deterioration of the oxidation catalyst based on the outflow exhaust gas temperature while the inflow exhaust gas temperature is in the high temperature region and on the outflow exhaust gas temperature while the inflow exhaust gas temperature is in the low temperature region.

According to the invention, it is possible to correctly detect the deterioration of the oxidation catalyst regardless of the causes of the deterioration of the oxidation catalyst.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
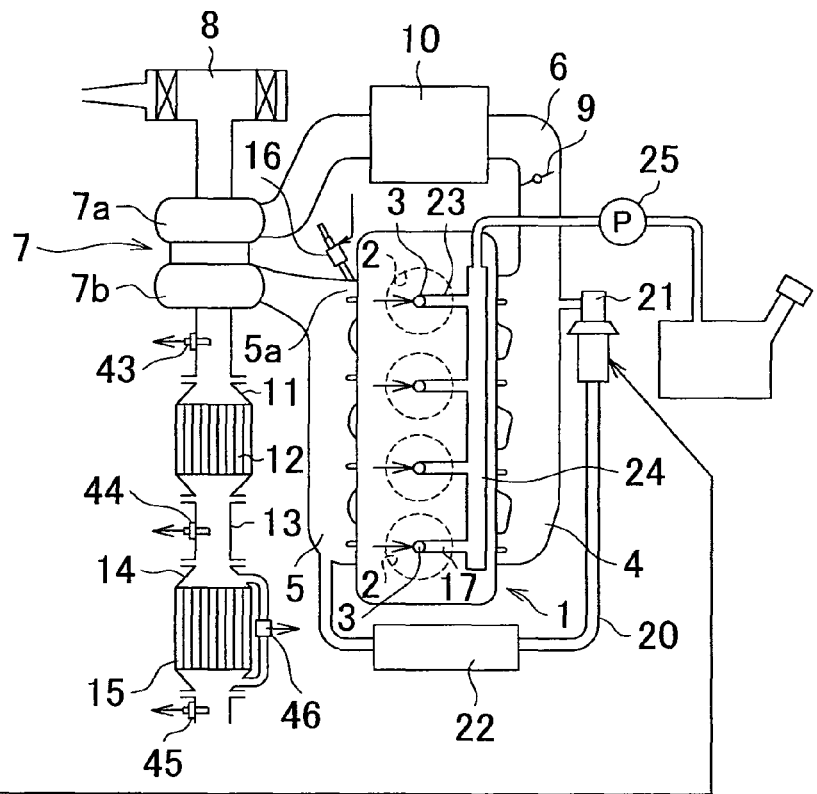
FIG. 1 is an overall view of an internal combustion engine equipped with a catalyst deterioration diagnosis system of the invention.
Figure 1:
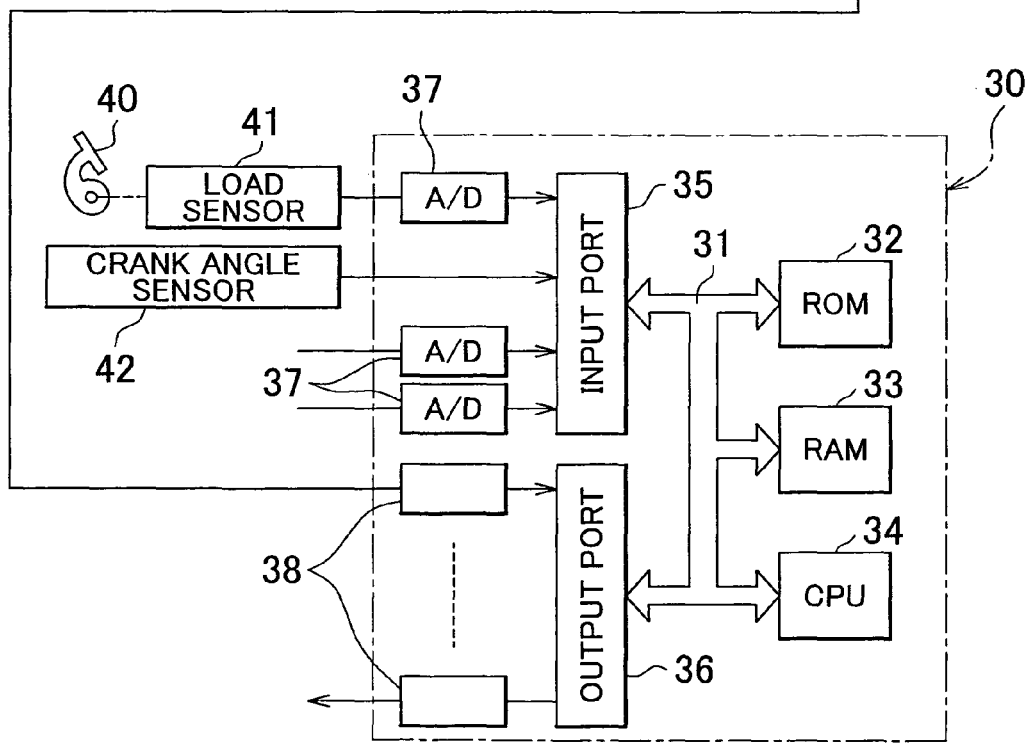

An embodiment of the invention will be described in detail below with reference to drawings. Note that in the following description, the same constituent elements are designated by the same reference numerals.

FIG. 1 shows an overall view of a compression self-ignition internal combustion engine equipped with a catalyst deterioration diagnosis system of the invention. Referring to FIG. 1, the reference numeral 1 designates an engine body; 2, combustion chambers of respective cylinders; 3, electronically-controlled fuel injection valves for injecting fuel into the respective combustion chambers; 4, an intake manifold; and 5, an exhaust manifold. The intake manifold 4 is connected to the outlet of a compressor 7a of an exhaust turbocharger 7 through an intake duct 6, and the inlet of the compressor 7a is connected to an air cleaner 8. A throttle valve 9 that is driven by a stepping motor is disposed in the intake duct 6. A cooling device 10 for cooling the intake air that flows in the intake duct 6 is disposed around the intake duct 6. In the embodiment shown in FIG. 1, engine cooling water is introduced into the cooling device 10 and the intake air is cooled by the engine cooling water.

The exhaust manifold 5 is connected to the inlet of an exhaust turbine 7b of the exhaust turbocharger 7. The outlet of the exhaust turbine 7b is connected to the inlet of an upstream-side catalytic converter 11. An oxidation catalyst 12 is disposed in the upstream-side catalytic converter 11. The outlet of the upstream-side catalytic converter 11 is connected to a downstream-side catalytic converter 14 through an exhaust pipe 13. A particulate filter 15 (hereinafter referred to simply as "the filter") is disposed in the downstream-side catalytic converter 14. A reducing agent supply device 16 is provided that supplies a reducing agent into a manifold branch pipe 5a for the first cylinder, for example, of the exhaust manifold 5. Note that the reducing agent supply device 16 may supply any substance, such as fuel, as long as it reacts with air to raise the temperature of the exhaust gas.

The exhaust manifold 5 and the intake manifold 4 are connected to each other via an exhaust gas recirculation (hereinafter referred to as "EGR") passage 20. An electronically controlled EGR control valve 21 is disposed in the EGR passage 20. A cooling device 22 for cooling the EGR gas that flows in the EGR passage 20 is disposed around the EGR passage 20. In the embodiment shown in FIG. 1, the engine cooling water is introduced into the cooling device 22 and the EGR gas is cooled by the engine cooling water. The fuel injection valves 3 are connected to a common rail 24 via fuel supply pipes 23. Fuel is supplied into the common rail 24 from an electronically controlled, variable discharge fuel pump 25. The fuel supplied into the common rail 24 is supplied to the fuel injection valves 3 through the fuel supply pipes 23.

An electronic control unit 30 includes a digital computer, which has a read only memory (ROM) 32, a random access memory (RAM) 33, a microprocessor (CPU) 34, an input port 35 and an output port 36, which are connected to each other via a bidirectional bus 31. Connected to an accelerator pedal 40 is a load sensor 41 that generates an output voltage proportional to the amount of depression of the accelerator pedal 40. The output voltage from the load sensor 41 is input to the input port 35 through an associated analogue/digital (A/D) converter 37. A crank angle sensor 42 that generates an output pulse every 10-degree rotation of the crankshaft, for example, is connected to the input port 35.

A temperature sensor 43 for detecting the temperature of the exhaust gas that flows into the oxidation catalyst 12 is attached to the exhaust pipe upstream of the oxidation catalyst 12. A temperature sensor 44 for detecting the temperature of the exhaust gas that flows out of the oxidation catalyst 12 and flows into the filter 15 is attached to the exhaust pipe 13 between the oxidation catalyst 12 and the filter 15. A temperature sensor 45 for detecting the temperature of the exhaust gas that flows out of the filter 15 is attached to the exhaust pipe downstream of the filter 15. The output signals from these temperature sensors 43 to 45 are input to the input port 35 through the respective corresponding A/D converters 37. A differential pressure sensor 46 for detecting the differential pressure across the filter 15 is attached to the filter 15. The output signal from the differential pressure sensor 46 is input to the input port 35 through the corresponding A/D converter 37. On the other hand, the output port 36 is connected to the fuel injection valves 3, the stepping motor for driving the throttle valve 9, the reducing agent supply device 16, the EGR control valve 21, and the fuel pump 25 through corresponding drive circuits 38.

First, the oxidation catalyst 12 shown in FIG. 1 will be described. The oxidation catalyst 12 is supported by a carrier, which is made of alumina, for example, provided on a porous material such as cordierite. The oxidation catalyst 12 oxidizes and removes the hydrocarbon (HC), carbon monoxide (CO), etc. contained in the inflow exhaust gas. In this embodiment, platinum (Pt), palladium (Pd), rhodium (Rh), etc. are used as the oxidation catalyst 12. However, another substance may be used as long as it causes oxidation.

Figure 2A:
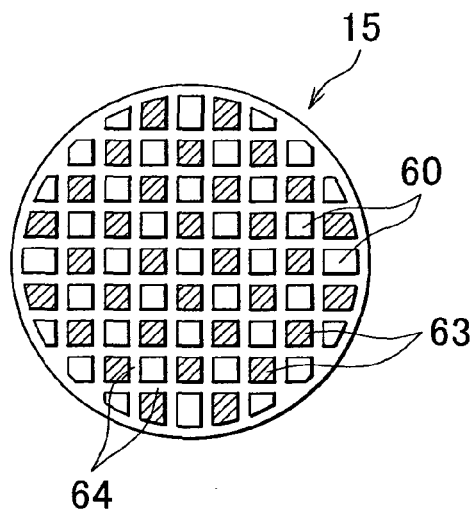
FIG. 2 is a diagram showing a structure of a filter.
Figure 2B:
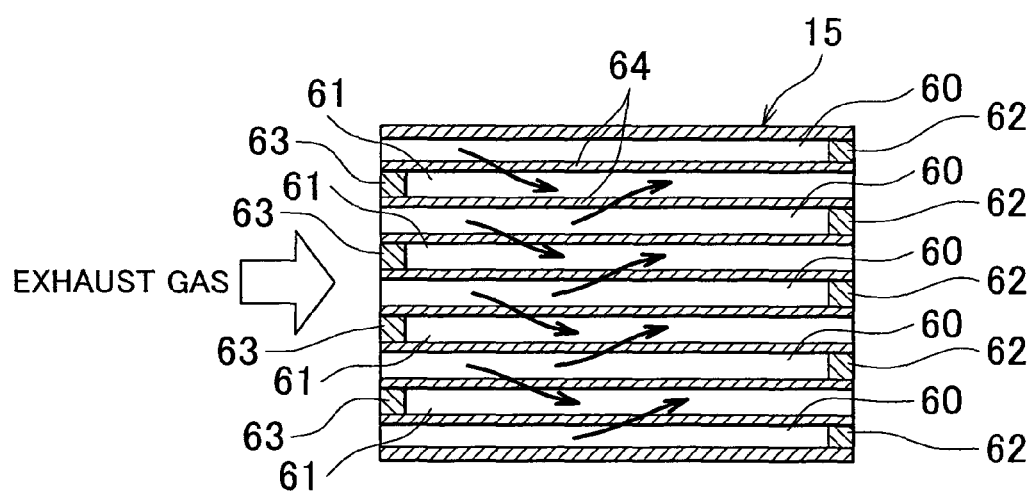

Next, the filter 15 shown in FIG. 1 will be described. FIGS. 2A and 2B show a structure of the filter 15. FIG. 2A shows a front view of the filter 15. FIG. 2B shows a sectional side view of the filter 15. As shown in FIGS. 2A and 2B, the filter 15 has a honeycomb structure, which has a plurality of exhaust gas passages 60, 61 that extend parallel to each other. The exhaust gas passages include exhaust gas inflow passages 60 that are closed by plugs 62 at the downstream ends and exhaust gas outflow passages 61 that are closed by plugs 63 at the upstream ends. In FIG. 2A, the portions with hatchings represent the plugs 63. The exhaust gas inflow passages 60 and the exhaust gas outflow passages 61 are alternately arranged with thin separation walls 64 interposed therebetween. Specifically, the exhaust gas inflow passages 60 and the exhaust gas outflow passages 61 are arranged such that each of the exhaust gas inflow passages 60 is surrounded by four exhaust gas outflow passages 61 and each of the exhaust gas outflow passages 61 is surrounded by four exhaust gas inflow passages 60.

The filter 15 is made of a porous material such as cordierite, for example. Thus, the exhaust gas that flows into the exhaust gas inflow passages 60 flows out into the adjacent exhaust gas outflow passages 61 through the surrounding separation walls 64 as shown by the arrows in FIG. 2B. While the exhaust gas flows through the separation walls 64 in this way, the particulate matter contained in the exhaust gas is collected by the filter 15.

The particulate matter collected by the filter 15 is accumulated on the filter 15. When the amount of accumulation of the particulate matter on the filter 15 increases, the pores in the separation walls 64 are clogged and the pressure loss of the exhaust gas due to the filter 15 increases. The increase in the pressure loss results in the reduction of the output power of the internal combustion engine and the deterioration of the combustion state in the internal combustion engine because the flow of the exhaust gas is impeded. Thus, in order to prevent the reduction in the output power of the internal combustion engine and the deterioration of the combustion state in the internal combustion engine, it is necessary to oxidize the particulate matter accumulated on the filter 15 for removal when the amount of accumulation of the particulate matter on the filter 15 exceeds the accumulation amount limit. The accumulation amount limit herein means the amount such that when the amount of accumulation of the particulate matter on the filter 15 exceeds this amount, the pressure loss caused by the filter 15 increases, which can result in the deterioration of the combustion state in the internal combustion engine, etc.

Thus, in this embodiment, when the amount of accumulation of the particulate matter on the filter 15 exceeds the accumulation amount limit, the temperature of the filter 15 is raised to temperatures equal to or above the temperature (650° C., for example) at which the particulate matter starts burning (hereinafter referred to as "the burning start temperature"), whereby a filter regeneration process is performed, in which the particulate matter accumulated on the filter 15 is oxidized and removed.

Specifically, a filter regeneration process is performed when the differential pressure across the filter 15 that is detected by the differential pressure sensor 46 exceeds the differential pressure limit. The differential pressure limit herein means the differential pressure across the filter 15 that occurs when the amount of accumulation of the particulate matter on the filter 15 reaches the accumulation amount limit.

While the filter regeneration process is performed, the temperature of the filter 15 is raised to temperatures equal to or above the burning start temperature of the particulate matter. By raising the temperature of the filter 15 to temperatures equal to or above the burning start temperature of the particulate matter in this way, the particulate matter accumulated on the filter 15 is burned, so that it is possible to suppress the increase in the pressure loss caused by the filter 15.

Raising the temperature of the filter 15 in the filter regeneration process is performed mainly by supplying the reducing agent from the reducing agent supply device 16 into the exhaust gas. The reducing agent supplied from the reducing agent supply device 16 is oxidized by the oxidation catalyst 12 disposed upstream of the filter 15 and the oxidation heat generated in this oxidation raises the temperature of the filter 15.

Raising temperature of the filter 15 is also performed by raising the temperature of the exhaust gas discharged from the engine body 1. Examples of the method of raising the temperature of the exhaust gas discharged from the engine body 1 are: performing after injections that are fuel injections into the combustion chambers 2 performed during expansion strokes to burn fuel in the combustion chambers 2 during the expansion strokes, thereby raising the temperature of the exhaust gas discharged from the engine body 1; retarding the fuel injection timing; and reducing the amount of opening of the EGR control valve 21 when the EGR control valve 21 is opened and EGR gas is supplied into the intake manifold 4.

Because of its property, the oxidation catalyst 12 deteriorates and the oxidation performance thereof is reduced when the oxidation catalyst 12 is exposed to high temperatures, contacts SOx contained in the exhaust gas, etc. When the oxidation performance is reduced, it becomes difficult to oxidize and remove the unburned HC and CO at low temperatures by the oxidation catalyst. Thus, especially when the temperature of the oxidation catalyst is low, such as when the internal combustion engine is cold-started, there is a fear that the exhaust emission becomes worse.

Thus, when the degree of deterioration of the oxidation catalyst 12 becomes high, it becomes necessary, for example, to change the operation control of the internal combustion engine at the time of cold start of the engine to warm up the oxidation catalyst 12 until the temperature of the oxidation catalyst 12 reaches a relatively higher temperature, or to change the oxidation catalyst 12. In order to change the operation control of the internal combustion engine or to change the oxidation catalyst 12 depending on the degree of deterioration of the oxidation catalyst 12 in this way, it is necessary to early and correctly detect the deterioration of the oxidation catalyst 12.

Figure 3:
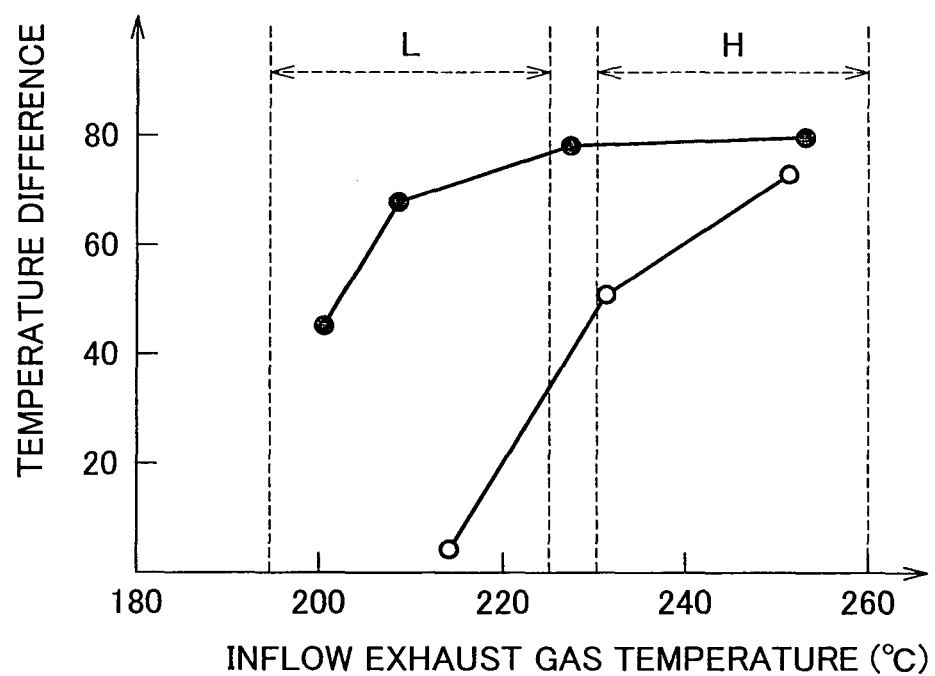
FIG. 3 is a diagram showing a relation between inflow exhaust gas temperature and the difference between outflow exhaust gas temperature and inflow exhaust gas temperature when a predetermined amount of reducing agent is supplied on the upstream side of the oxidation catalyst.

FIG. 3 is a diagram showing a relation between the temperature of the exhaust gas that flows into the oxidation catalyst 12 (hereinafter referred to as "the inflow exhaust gas") and the difference in temperature between the exhaust gas that flows out of the oxidation catalyst 12 (hereinafter referred to as "the outflow exhaust gas") and the inflow exhaust gas when a predetermined amount of reducing agent is supplied on the upstream side of the oxidation catalyst 12. The filled circles in FIG. 3 represent the relation when the oxidation catalyst 12 is fresh, that is, when the oxidation catalyst 12 has not deteriorated yet, and the open circles in FIG. 3 represent the relation when the oxidation catalyst 12 has deteriorated.

As shown in FIG. 3, the outflow exhaust gas temperature is higher than the inflow exhaust gas temperature and therefore, there is a temperature difference therebetween. This is because the reducing agent is oxidized on the oxidation catalyst 12, which results in an exothermic reaction, so that the temperature of the exhaust gas is raised. Thus, the difference between the inflow exhaust gas temperature and the outflow exhaust gas temperature is equivalent to the amount of heat generated by the oxidation of the reducing agent on the oxidation catalyst 12.

As shown in FIG. 3, when the inflow exhaust gas temperature is in the high temperature region H, that is, when the temperature is approximately between 230° C. and 260° C. in the case shown in FIG. 3, the difference between the inflow exhaust gas temperature and the outflow exhaust gas temperature is large regardless of the degree of deterioration of the oxidation catalyst 12. This is because even when the oxidation catalyst 12 has deteriorated, the oxidation performance of the oxidation catalyst 12 is high and a large amount of reducing agent is oxidized on the oxidation catalyst 12 when the inflow exhaust gas temperature is in the high temperature region H.

On the other hand, when the inflow exhaust gas temperature is in the low temperature region L, that is, when the temperature is approximately between 195° C. and 225° C. in the case shown in FIG. 3, the difference between the inflow exhaust gas temperature and the outflow exhaust gas temperature is large when the degree of deterioration of the oxidation catalyst 12 is low (filled circles in FIG. 3). This is because if the oxidation catalyst 12 has not deteriorated, the oxidation performance of the oxidation catalyst 12 is high and a large amount of reducing agent is oxidized on the oxidation catalyst 12 even when the inflow exhaust gas temperature is reduced. However, when the degree of deterioration of the oxidation catalyst 12 is high (open circles in FIG. 3), the difference between the inflow exhaust gas temperature and the outflow exhaust gas temperature is small. This is because when the oxidation catalyst 12 has deteriorated, the oxidation performance of the oxidation catalyst 12 is reduced and only a small amount of reducing agent is oxidized on the oxidation catalyst 12 when the temperature of the inflow exhaust gas is reduced.

Thus, it is possible to detect the degree of deterioration of the oxidation catalyst 12 by detecting the outflow exhaust gas temperature when the inflow exhaust gas temperature is in the low temperature region L. Specifically, if the outflow exhaust gas temperature is significantly higher than the inflow exhaust gas temperature that are detected when the inflow exhaust gas temperature is in the low temperature region L, it can be considered that the degree of deterioration of the oxidation catalyst 12 is low, and on the other hand, if the detected outflow exhaust gas temperature is not so higher than the inflow exhaust gas temperature, it can be considered that the degree of deterioration of the oxidation catalyst 12 is high.

However, in actuality, the temperature sensor has error, etc., and as a result, even when the outflow exhaust gas temperature detected by the temperature sensor 44 that is disposed downstream of the oxidation catalyst 12 is significantly higher than the inflow exhaust gas temperature, it cannot be said that the degree of deterioration of the oxidation catalyst 12 is always low, and even when the outflow exhaust gas temperature detected by the temperature sensor 44 is not so higher than the inflow exhaust gas temperature, it cannot be said that the degree of deterioration of the oxidation catalyst 12 is always high.

Thus, in this embodiment, the outflow exhaust gas temperature is detected both when the inflow exhaust gas temperature is in the low temperature region and when the inflow exhaust gas temperature is in the high temperature region, and the deterioration of the oxidation catalyst is detected based on the detected outflow exhaust gas temperatures.

Specifically, as shown by the filled circles in FIG. 3, when the degree of deterioration of the oxidation catalyst 12 is low, the difference in the outflow exhaust gas temperature is relatively small between when the inflow exhaust gas temperature is in the low temperature region and when the inflow exhaust gas temperature is in the high temperature region. Such a tendency is the same also when the temperature sensor 44 that detects the outflow exhaust gas temperature has error. Thus, even when the temperature sensor 44 has error, it can be said that the degree of deterioration of the oxidation catalyst 12 is low when the difference between the outflow exhaust gas temperature detected by the temperature sensor 44 when the inflow exhaust gas temperature is in the low temperature region and the outflow exhaust gas temperature detected by the temperature sensor 44 when the inflow exhaust gas temperature is in the high temperature region is relatively small.

On the other hand, as shown by the open circles in FIG. 3, when the degree of deterioration of the oxidation catalyst 12 is high, the outflow exhaust gas temperature significantly differs between when the inflow exhaust gas temperature is in the low temperature region and when the inflow exhaust gas temperature is in the high temperature region. Such a tendency is the same also when the temperature sensor 44 that detects the outflow exhaust gas temperature has error. Thus, even when the temperature sensor 44 has error, it can be said that the degree of deterioration of the oxidation catalyst 12 is high when there is a significant difference between the outflow exhaust gas temperature detected by the temperature sensor 44 when the inflow exhaust gas temperature is in the low temperature region and the outflow exhaust gas temperature detected by the temperature sensor 44 when the inflow exhaust gas temperature is in the high temperature region.

Figure 4:
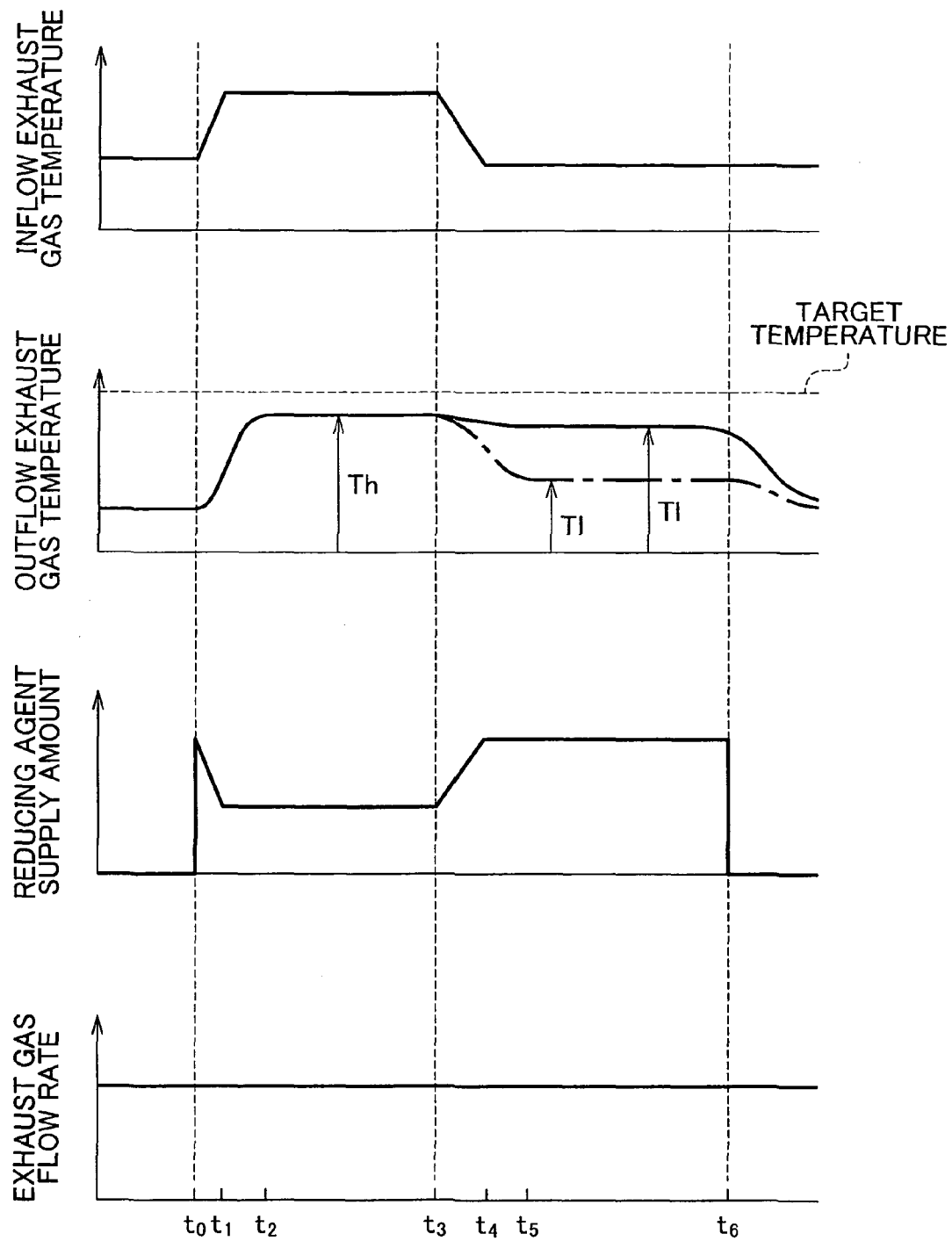
FIG. 4 shows time charts of inflow exhaust gas temperature, outflow exhaust gas temperature, amount of reducing agent supplied, and flow rate of the exhaust gas during the diagnosis of deterioration of the oxidation catalyst.

FIG. 4 shows time charts of the inflow exhaust gas temperature, the outflow exhaust gas temperature, the amount of reducing agent supplied, and the flow rate of the exhaust gas during the diagnosis of deterioration of the oxidation catalyst 12. In the example shown in FIG. 4, the amount of reducing agent supplied is controlled based on the inflow exhaust gas temperature and the difference between the target temperature and the outflow exhaust gas temperature so that the outflow exhaust gas temperature is brought to the target temperature. Thus, when the inflow exhaust gas temperature increases, the amount of reducing agent supplied is reduced and on the other hand, when the inflow exhaust gas temperature decreases, the amount of reducing agent supplied is increased. As shown by the broken line in FIG. 4, the target temperature of the outflow exhaust gas is kept constant throughout the period during which the diagnosis of deterioration of the oxidation catalyst 12 is performed.

In the example shown in FIG. 4, at time $t_0$, a high temperature keeping process is started, in which the inflow exhaust gas temperature is raised to a temperature in the high temperature region and kept at the temperature in the high temperature region, and at the same time, at time $t_0$, supplying the reducing agent is started. The inflow exhaust gas temperature is raised by increasing the amount of injection of the after injection, starting the after injection, retarding fuel injection timing, reducing the amount of EGR gas added to the intake gas, etc. The outflow exhaust gas temperature is raised by raising the inflow exhaust gas temperature and supplying a reducing agent. Because the amount of reducing agent supplied is controlled based on the difference between the target temperature and the inflow exhaust gas temperature, the amount of reducing agent supplied from the reducing agent supply device 16 is reduced as the inflow exhaust gas temperature increases.

When a certain time has passed since the high temperature keeping process was started, the inflow exhaust gas temperature reaches a temperature in the high temperature region (at time $t_1$ in FIG. 4) and then, the inflow exhaust gas temperature is kept substantially constant. The amount of reducing agent is also kept substantially constant. The outflow exhaust gas temperature somewhat increases even after the inflow exhaust gas temperature reaches the temperature in the high temperature region and keeping the temperature constant is started. Thereafter, the outflow exhaust gas temperature is kept constant (after time $t_2$, for example).

In this embodiment, after keeping the outflow exhaust gas temperature constant is started, that is, after time $t_2$, detection of the outflow exhaust gas temperature while the inflow exhaust gas temperature is in the high temperature region is performed. It takes time for the reducing agent to reach the oxidation catalyst 12 after the high temperature keeping process and the supply of the reducing agent are started, there is a time lag between when the reducing agent reaches the oxidation catalyst 12 and when reaction on the oxidation catalyst 12 is started, and in addition, the temperature sensor 44 that detects the outflow exhaust gas temperature shows detection lag. Thus, it takes a certain time from when the high temperature keeping process and supply of the reducing agent are started to when keeping constant the outflow exhaust gas temperature detected by the temperature sensor 44 is started. If detection of the outflow exhaust gas temperature for the diagnosis of deterioration of the oxidation catalyst 12 is performed before the certain time has passed, correct diagnosis of the deterioration of the oxidation catalyst 12 cannot be performed. Thus, in this embodiment, the detection of the outflow exhaust gas temperature is performed after keeping the outflow exhaust gas temperature constant is started.

In actuality, whether the outflow exhaust gas temperature is kept constant cannot be determined unless a certain time has passed since keeping the outflow exhaust gas temperature constant was started. The outflow exhaust gas temperature varies also when the engine operating conditions vary, and therefore, the outflow exhaust gas temperature is not always constant while the outflow exhaust gas temperature is actually detected.

Thus, in this embodiment, instead of starting detection of the outflow exhaust gas temperature for diagnosis of deterioration of the catalyst based on whether the outflow exhaust gas temperature is kept constant, the detection of the outflow exhaust gas temperature for diagnosis of deterioration of the catalyst is started based on whether the total amount of air taken in since the high temperature keeping process or the supply of the reducing agent was started exceeds a reference value. In general, the total amount of intake air is proportional to the amount of fuel supplied and therefore proportional to the amount of heat generated in the internal combustion engine and the amount of heat supplied to the oxidation catalyst 12. Thus, the total amount of intake air is used as the criterion for determining whether the heat, the amount of which is large enough to sufficiently increase the temperature of the oxidation catalyst 12, is supplied to the oxidation catalyst 12. Thus, it is possible to set, as the detection start timing, the timing that is after keeping the outflow exhaust gas temperature constant is started and that is a relatively early timing, by determining the timing, at which the detection of the outflow exhaust gas temperature is started, based on the total amount of intake air.

In the above embodiment, the timing, at which the detection of the outflow exhaust gas temperature is started, is determined based on whether the total amount of air taken in since the high temperature keeping process or the supply of the reducing agent was started is equal to or greater than the reference value. However, the timing, at which the detection of the outflow exhaust gas temperature is started, may be determined based on another parameter. For example, the timing, at which the detection of the outflow exhaust gas temperature is started, may be determined based on whether the time period for which the internal combustion engine has operated since the high temperature keeping process or the supply of the reducing agent was started is equal to or greater than a reference time period, for example. Alternatively, the timing, at which the detection of the outflow exhaust gas temperature is started, may be determined based on whether the total amount of fuel and the reducing agent supplied after the high temperature keeping process or the supply of the reducing agent was started is equal to or greater than a reference amount.

In this embodiment, the detection of the outflow exhaust gas temperature while the inflow exhaust gas temperature is in the high temperature region is performed for a certain period of time after the detection of the outflow exhaust gas temperature is started. The mean value of the temperatures of the inflow exhaust gas detected for a certain period of time is used, in the diagnosis of the deterioration of the oxidation catalyst 12, as the outflow exhaust gas temperature while the inflow exhaust gas temperature is in the high temperature region.

Then, at time $t_3$, the high temperature keeping process is ended while the supply of the reducing agent is continued, and the engine body 1 is operated normally. As a result, the temperature of the inflow exhaust gas is gradually decreased. When the engine body 1 is operated normally in this way, in principle, it is possible to reduce the temperature of the inflow exhaust gas to a temperature in the low temperature region and keep the same temperature, and therefore, the normal operation may be called a low temperature keeping process.

However, if the temperature of the inflow exhaust gas does not decrease even when the normal operation is performed after the high temperature keeping process is ended, a temperature reducing control to forcibly reduce the temperature of the exhaust gas that flows out of the engine body 1 may be performed. Examples of the temperature reducing control are: reducing the amount of injection of the after injection, stopping the after injection; advancing the fuel injection timing; and increasing the amount of the EGR gas supplied into the intake gas, which are inverse to those of the high temperature keeping process.

When the high temperature keeping process is ended and the low temperature keeping process is started at time $t_3$, the temperature of the inflow exhaust gas is gradually reduced and the amount of reducing agent supplied is gradually increased simultaneously. The temperature of the inflow exhaust gas finally reaches a temperature in the low temperature region (at time $t_4$ in FIG. 4), and then, the inflow exhaust gas temperature is kept substantially constant. The amount of reducing agent supplied is also kept substantially constant. The outflow exhaust gas temperature somewhat decreases also after the inflow exhaust gas temperature reaches a temperature in the low temperature region and keeping the inflow exhaust gas temperature constant is started. Thereafter, the outflow exhaust gas temperature is kept constant (after time $t_5$, for example).

In this embodiment, as in the case where the outflow exhaust gas temperature is detected while the inflow exhaust gas temperature is in the high temperature region, also when the inflow exhaust gas temperature is in the low temperature region, the outflow exhaust gas temperature is detected after keeping the outflow exhaust gas temperature constant is started, that is, after time $t_5$. In actuality, detection of the outflow exhaust gas temperature may be performed after the total amount of air taken in since the low temperature keeping process was started exceeds the reference value, after the time period for which the internal combustion engine has operated since the low temperature keeping process was started exceeds a reference period of time, or after the total amount of fuel and reducing agent supplied after the low temperature keeping process was started becomes equal to or greater than the reference amount.

In this way, the outflow exhaust gas temperature while the inflow exhaust gas temperature is in the high temperature region and the outflow exhaust gas temperature while the inflow exhaust gas temperature is in the low temperature region are detected. The diagnosis of the deterioration of the oxidation catalyst 12 is performed based on the outflow exhaust gas temperatures detected in this way.

The manner of variation in the outflow exhaust gas temperature differs between when the oxidation catalyst 12 is deteriorated little and when the oxidation catalyst 12 has deteriorated. When the oxidation catalyst 12 is deteriorated little (the case shown by the solid line in FIG. 4), the outflow exhaust gas temperature varies as shown by the solid line in FIG. 4. Specifically, when the inflow exhaust gas temperature is brought to a temperature in the low temperature region, the outflow exhaust gas temperature also slightly decreases simultaneously. However, the amount of this decrease is substantially equal to the amount of decrease in the inflow exhaust gas temperature. Specifically, the outflow exhaust gas temperature is reduced by the amount corresponding to the amount of reduction in the inflow exhaust gas temperature or by the amount slightly less than the amount of reduction in the inflow exhaust gas temperature.

On the other hand, when the oxidation catalyst 12 has deteriorated (the case shown by the chain line in FIG. 4), the outflow exhaust gas temperature varies as shown by the chain line in FIG. 4. Specifically, when the inflow exhaust gas temperature is brought to a temperature in the low temperature region, the outflow exhaust gas temperature is significantly reduced simultaneously. The amount of this decrease in the outflow exhaust gas temperature is greater than the amount of decrease in the inflow exhaust gas temperature.

Thus, when the oxidation catalyst 12 is deteriorated little, the difference $\Delta T$ (=Th−Tl) between the outflow exhaust gas temperature Th that is detected by the temperature sensor 44 while the inflow exhaust gas temperature is in the high temperature region and the outflow exhaust gas temperature Tl that is detected by the temperature sensor 44 while the inflow exhaust gas temperature is in the low temperature region, is small. On the other hand, when the oxidation catalyst 12 has deteriorated, the difference $\Delta T$ between the outflow exhaust gas temperature Th that is detected by the temperature sensor 44 while the inflow exhaust gas temperature is in the high temperature region and the outflow exhaust gas temperature Tl that is detected by the temperature sensor 44 while the inflow exhaust gas temperature is in the low temperature region, is large.

Thus, it is possible to detect the degree of deterioration of the oxidation catalyst 12 based on the difference $\Delta T$. Specifically, when the difference $\Delta T$ is large, it is determined that the degree of deterioration of the oxidation catalyst 12 is high. On the other hand, when the difference $\Delta T$ is small, it is determined that the degree of deterioration of the oxidation catalyst 12 is low. In this embodiment, when the difference $\Delta T$ is greater than a predetermined difference $\Delta Tx$, it is determined that the oxidation catalyst 12 has deteriorated, and when the difference $\Delta T$ is equal to or less than the predetermined difference $\Delta Tx$, it is determined that the oxidation catalyst 12 has not deteriorated.

In this embodiment, the high temperature keeping process and the low temperature keeping process are performed while the filter regeneration process is performed. In particular, in this embodiment, when the temperature of the filter 15 should be increased to perform the filter regeneration process, that is, when the differential pressure across the filter 15 that is detected by the differential pressure sensor 46 exceeds the differential pressure limit, the temperature of the filter 15 is increased by performing the high temperature keeping process and supplying the reducing agent. Thus, in this embodiment, the target temperature of the outflow exhaust gas is equal to or higher than the temperature at which the particulate matter starts burning.

In the above-described embodiment, the degree of deterioration of the oxidation catalyst 12 is detected based on the difference $\Delta T$. However, the degree of deterioration of the oxidation catalyst 12 may be detected based on the ratio Rt between the outflow exhaust gas temperature Th that is detected by the temperature sensor 44 while the inflow exhaust gas temperature is in the high temperature region and the outflow exhaust gas temperature Tl that is detected by the temperature sensor 44 while the inflow exhaust gas temperature is in the low temperature region (=Th/Tl). In this case, when the ratio Rt has a value far from 1, it is determined that the degree of deterioration of the oxidation catalyst 12 is high, and on the other hand, when the ratio Rt has a value near 1, it is determined that the degree of deterioration of the oxidation catalyst 12 is low.

In the above-described embodiment, the high temperature keeping process is first performed to detect the outflow exhaust gas temperature while the inflow exhaust gas temperature is in the high temperature region, and then the low temperature keeping process is performed to detect the outflow exhaust gas temperature while the inflow exhaust gas temperature is in the low temperature region. However, this may be performed in the inverse order. Specifically, a mode may be adopted in which the low temperature keeping process is first performed and then the high temperature keeping process is performed.

In the above embodiment, the inflow exhaust gas temperature and the outflow exhaust gas temperature are detected by the temperature sensor 43 and the temperature sensor 44, respectively. However, the inflow exhaust gas temperature may be estimated based on the engine load, etc. without using the temperature sensor 43. The outflow exhaust gas temperature may be detected by the temperature sensor 45. Alternatively, these, temperatures may be estimated from other parameters without using the temperature sensors. Otherwise, the inlet temperature of the oxidation catalyst may be used instead of the inflow exhaust gas temperature and the outlet temperature of the oxidation catalyst may be used instead of the outflow exhaust gas temperature. In this case, the inlet temperature of the oxidation catalyst 12 is detected by the temperature sensor provided upstream of the oxidation catalyst 12, for example, and the outlet temperature of the oxidation catalyst 12 is detected by the temperature sensor provided downstream of the oxidation catalyst 12, for example.

Figure 5:
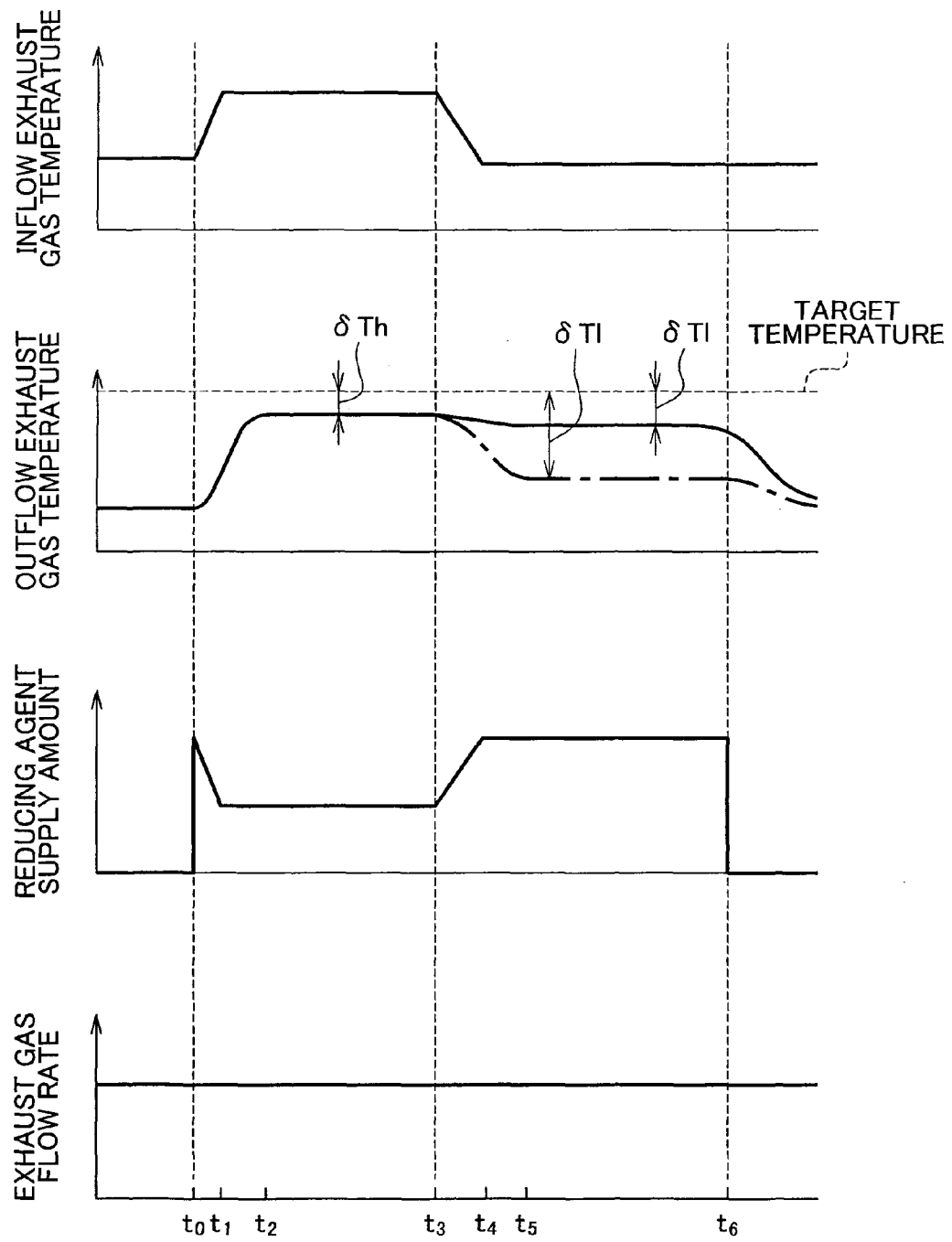
FIG. 5 is a diagram, corresponding to FIG. 4, for explaining a second embodiment.

Next, a second embodiment of the invention will be described with reference to FIG. 5. The construction and operation of the catalyst deterioration diagnosis system of the second embodiment are basically the same as the construction and operation of the catalyst deterioration diagnosis system of the first embodiment. The degree of deterioration of the oxidation catalyst 12 is detected based on the difference $\Delta T$ between the outflow exhaust gas temperatures Th, Tl in the first embodiment, whereas in the second embodiment, the degree of deterioration of the oxidation catalyst 12 is detected based on the difference $\Delta T'$ ($\delta Tl-\delta Th$) between the difference $\delta Th$ between the target temperature Tt and the outflow exhaust gas temperature Th while the inflow exhaust gas temperature is in the high temperature region and the difference $\delta Tl$ between the target temperature Tt and the outflow exhaust gas temperature Tl while the inflow exhaust gas temperature is in the low temperature region.

In this case, if the oxidation catalyst 12 is deteriorated little, the difference $\Delta T'$ between the temperature difference $\delta Th$ while the inflow exhaust gas temperature is in the high temperature region and the temperature difference δTl while the inflow exhaust gas temperature is in the low temperature region, is small. On the other hand, if the oxidation catalyst 12 has deteriorated, the difference ΔT' between the temperature difference δTh while the inflow exhaust gas temperature is in the high temperature region and the temperature difference δTl while the inflow exhaust gas temperature is in the low temperature region, is large. Thus, when the difference ΔT' is large, it is determined that the degree of deterioration of the oxidation catalyst 12 is large. When the difference ΔT' is small, it is determined that the degree of deterioration of the oxidation catalyst 12 is low.

When the degree of deterioration of the oxidation catalyst 12 is low, the outflow exhaust gas temperature almost reaches the target temperature. On the other hand, when the degree of deterioration of the oxidation catalyst 12 is high, the outflow exhaust gas temperature is significantly lower than the target temperature. In other words, it is considered that the difference between the target temperature and the actual temperature of the outflow exhaust gas indicates the degree of deterioration of the oxidation catalyst 12. Thus, when the degree of deterioration of the oxidation catalyst 12 is determined based on the difference between the target temperature and the actual temperature of the outflow exhaust gas according to this embodiment, it is possible to determine the degree of deterioration of the oxidation catalyst 12 with higher accuracy.

Figure 6:
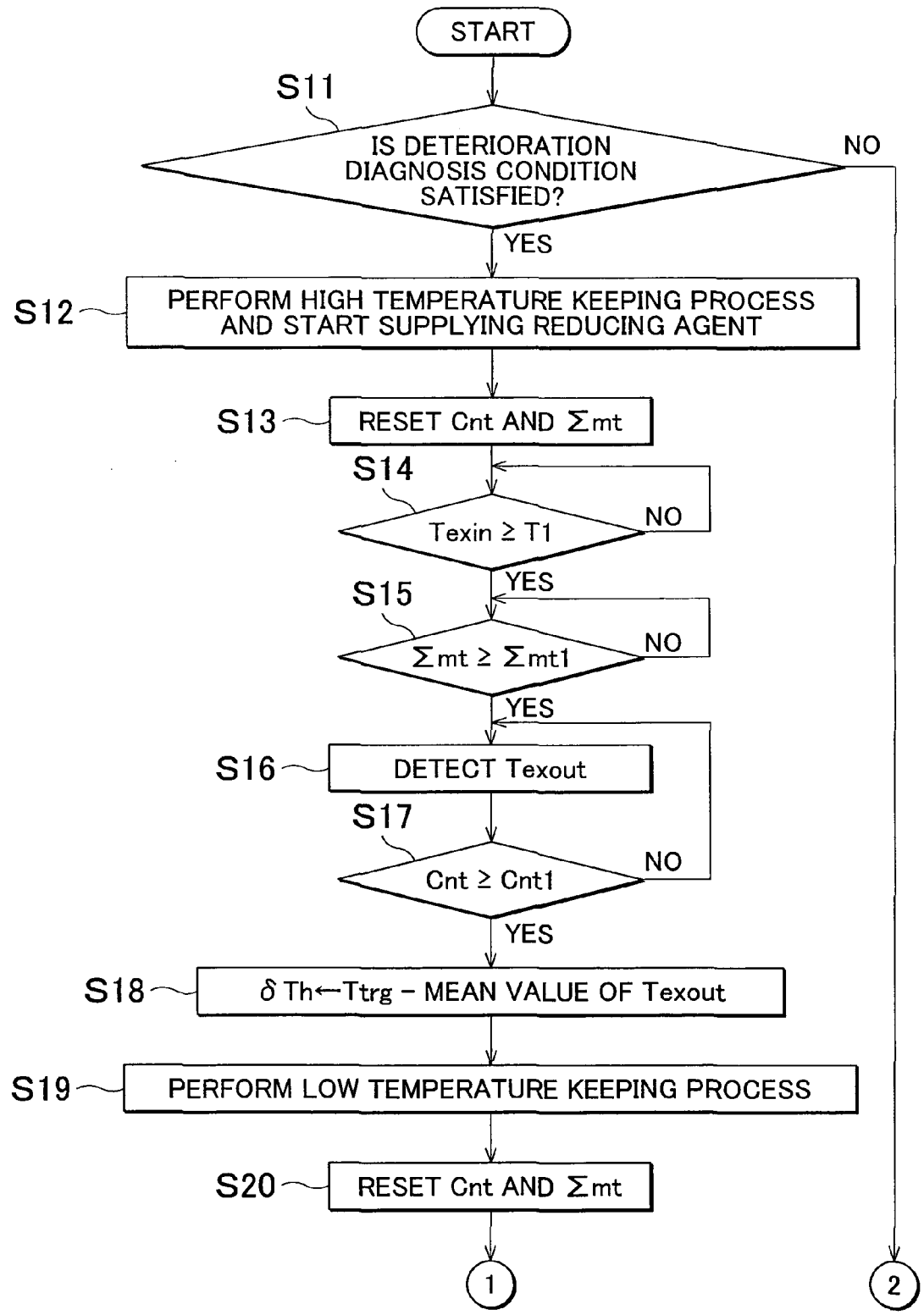
FIG. 6 shows a part of a flow chart of a control routine for diagnosis of deterioration of the oxidation catalyst.
Figure 7:
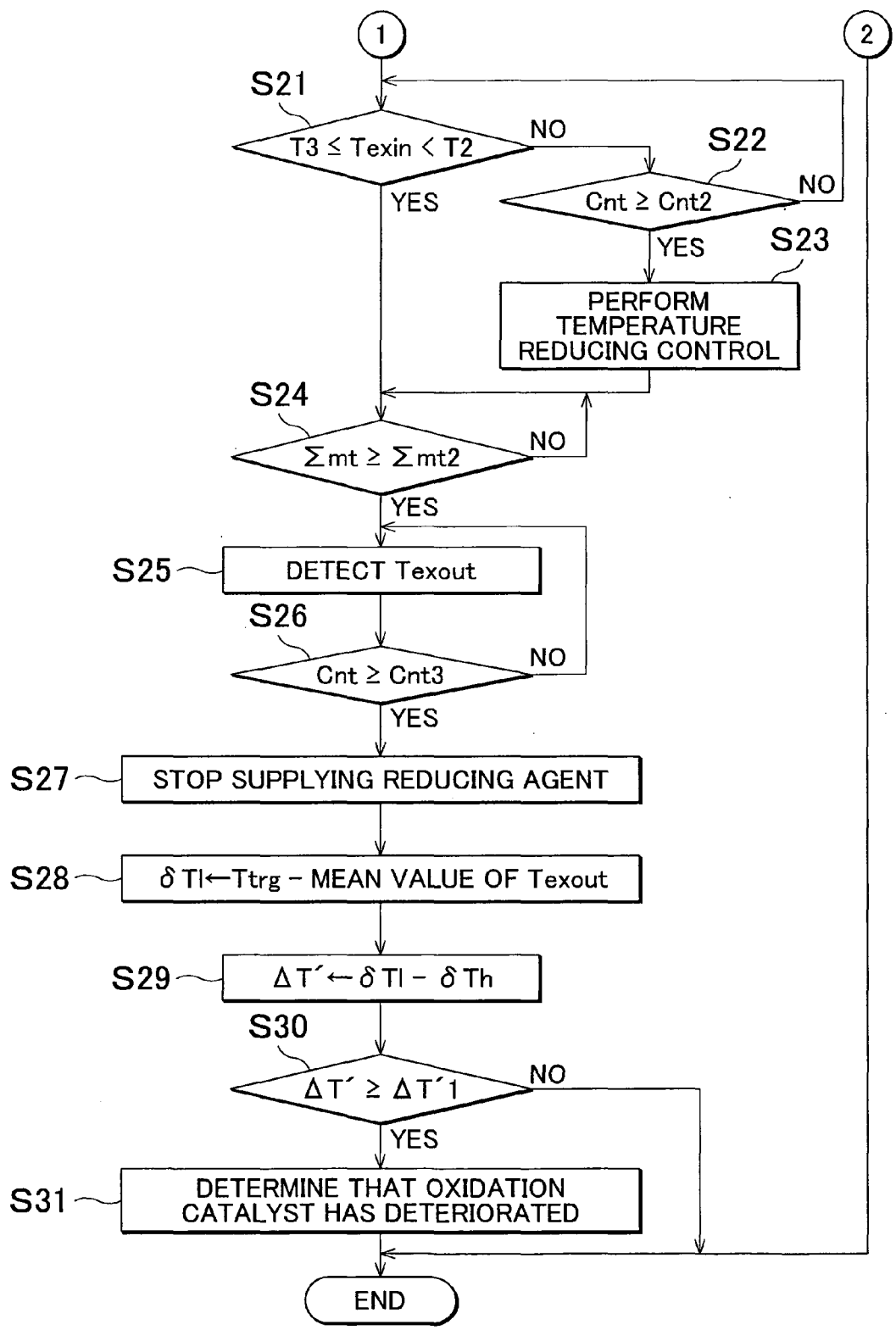
FIG. 7 shows a part of the flow chart of the control routine for diagnosis of deterioration of the oxidation catalyst.

FIGS. 6 and 7 show flow charts of a control routine for diagnosis of deterioration of the oxidation catalyst 12 of this embodiment.

As shown in FIGS. 6 and 7, first, it is determined in step S11 whether a condition for making a diagnosis of deterioration of the oxidation catalyst 12 is satisfied. "When the deterioration diagnosis condition is satisfied" means, for example, when the condition for performing the filter regeneration process is satisfied, that is, the differential pressure across the filter 15 that is detected by the differential pressure sensor 46 is greater than the differential pressure limit. When it is determined that the deterioration diagnosis condition is not satisfied, the control routine is exited. On the other hand, when it is determined that the deterioration diagnosis condition of the oxidation catalyst 12 is satisfied, the process proceeds to step S12.

In step S12, the high temperature keeping process is started and the supply of the reducing agent is started. Subsequently, in step S13, the time counter Cnt and the total intake air amount Σmt are reset. The time counter Cnt is a counter variable for measuring the time that has passed since the time counter Cnt was reset. The total intake air amount Σmt is the total amount of air taken in since the total intake air amount Σmt was reset.

Next, in step S14, it is determined whether the inflow exhaust gas temperature Texin that is detected by the temperature sensor 43 is equal to or higher than the lower limit value T1 of the high temperature region. When the inflow exhaust gas temperature Texin is lower than the lower limit value T1, step S14 is repeated until the inflow exhaust gas temperature Texin becomes equal to or higher than the lower limit value T1. When the inflow exhaust gas temperature Texin becomes equal to or higher than the lower limit value T1, the process proceeds to step S15.

Next, in step S15, it is determined whether the total amount Σmt of air taken in since the high temperature keeping process was started becomes equal to or higher than a reference value Σmt1. When it is determined that the total amount Σmt of the intake air is not equal to or greater than the reference value Σmt1 yet, step S15 is repeated until the total amount Σmt of the intake air becomes equal to or greater than the reference value Σmt1. When the total amount Σmt of the intake air becomes equal to or greater than the reference value Σmt1, the process proceeds to step S16.

In step S16, the outflow exhaust gas temperature Texout is detected by the temperature sensor 44. Subsequently, in step S17, it is determined whether the time Cnt1 required to obtain highly reliable data has passed since the high temperature keeping process was started. When it is determined that the time Cnt1 has not passed, the detection of the outflow exhaust gas temperature Texout is repeatedly performed. Then, after the time Cnt1 has passed since the high temperature keeping process was started, the process proceeds to step S18. In step S18, the value obtained by subtracting the mean value of the outflow exhaust gas temperatures Texout that were detected in steps S16 and S17 from the target temperature Ttrg is defined as the temperature difference δTh (=Ttrg−Texout). In this way, the temperature difference δTh while the inflow exhaust gas temperature is in the high temperature region is computed.

Next, in step S19, the low temperature keeping process is started while the supply of the reducing agent is continued. Then, in step S20, the time counter Cnt and the total intake air amount Σmt are again reset. Subsequently, in step S21, it is determined whether the inflow exhaust gas temperature Texin that is detected by the temperature sensor 43 falls between the upper limit value T2 and the lower limit value T3 of the low temperature region. When it is determined in step S21 that the inflow exhaust gas temperature Texin is in the low temperature region, the process proceeds to step S24. On the other hand, when it is determined in step S21 that the inflow exhaust gas temperature Texin is not in the low temperature region, the process proceeds to step S22. In step S22, it is determined whether a predetermined time Cnt2 has passed since the low temperature keeping process was started. When it is determined that the predetermined time Cnt2 has not passed, the process returns to step S21. On the other hand, when it is determined in step S22 that the predetermined time Cnt2 has passed since the low temperature keeping process was started, the process proceeds to step S23. In step S23, the temperature reducing control to forcibly reduce the inflow exhaust gas temperature is performed. That is, when the inflow exhaust gas temperature Texin does not become a temperature in the low temperature region even after the predetermined time Cnt2 has passed since the low temperature keeping process was started, the temperature reducing control is performed. The process then proceeds to step S24.

In step S24, it is determined whether the total amount Σmt of air taken in since the low temperature keeping process was started is equal to or greater than the reference value Σmt2. When it is determined that the total amount Σmt of the intake air is not equal to or greater than the reference value Σmt2, step S24 is repeated until the total amount Σmt of the intake air becomes equal to or greater than the reference value Σmt2. When the total amount Σmt of the intake air becomes equal to or greater than the reference value Σmt2, the process proceeds to step S25.

In step S25, the outflow exhaust gas temperature Texout is detected by the temperature sensor 44. Then, in step S26, it is determined whether the time Cnt3 required to obtain highly reliable data has passed since the low temperature keeping process was started. When it is determined that the time Cnt3 has not passed, the detection of the outflow exhaust gas temperature Texout is repeatedly performed. Then, after the time Cnt3 has passed since the high temperature keeping process was started, the process proceeds to step S27. In step S27, supply of the reducing agent is stopped. In step S28, the value obtained by subtracting the mean value of the outflow exhaust gas temperatures Texout that were detected in steps S25 and S26 from the target temperature Ttrg is defined as the temperature difference δTl (=Ttrg−Texout). In this way, the temperature difference δTl while the inflow exhaust gas temperature is in the low temperature region is computed.

Next, in step S29, the value obtained by subtracting the temperature difference δTh computed in step S28 from the temperature difference δTl computed in step S18 is defined as the difference ΔT'. In step S30, when it is determined that the difference ΔT' computed in step S29 is less than a predetermined difference ΔT'x, the control routine is exited. On the other hand, when it is determined that the difference ΔT' computed in step S29 is equal to or greater than the predetermined difference ΔT'x, the process proceeds to step S31. In step S31, it is determined that the oxidation catalyst 12 has deteriorated, and the control routine is exited.

In the above embodiment, the diagnosis of deterioration of the oxidation catalyst 12 is performed while the process for regenerating the filter 15 is performed. However, a configuration may be adopted in which, instead of the filter 15, a NOx storage-reduction catalyst is provided that stores NOx contained in the exhaust gas when the oxygen concentration in the inflow exhaust gas is high, and that releases the stored NOx when the oxygen concentration in the inflow exhaust gas is low, and in which the diagnosis of deterioration of the oxidation catalyst 12 is performed while a sulfur poisoning recovering process for releasing SOx stored in the NOx storage-reduction catalyst is performed.

In the above embodiment, the deterioration of the oxidation catalyst 12 is determined. However, it is possible to detect the deterioration of any exhaust gas purification means as long as the exhaust gas purification means has an oxidation capability. Examples of such exhaust gas purification means include a NOx storage-reduction catalyst, a particulate filter in which catalyst noble metal is supported, etc.

Further, in the above embodiment, the reducing agent supply device 16 is used as the means for supplying the reducing agent to the oxidation catalyst 12. However, a configuration may be adopted in which the reducing agent is supplied to the oxidation catalyst 12 by, for example, performing post injections, etc. to discharge the exhaust gas that contains a reducing agent (fuel) from the engine body 1.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

The invention claimed is:

1. A catalyst deterioration diagnosis system for an exhaust gas purification device including an oxidation catalyst that oxidizes a component of an inflow exhaust gas and a reducing agent supply device that supplies a reducing agent into the exhaust gas that flows into the oxidation catalyst, the catalyst deterioration diagnosis system comprising:
an electronic control unit that includes control logic, which when executed:
detects or estimates an outflow exhaust gas temperature, which is a temperature of the exhaust gas that flows out of the oxidation catalyst or an outlet temperature of the oxidation catalyst; and
performs a diagnosis of deterioration of the oxidation catalyst based on a detected value or an estimated value of the outflow exhaust gas temperature,
wherein the electronic control unit performs the diagnosis of deterioration of the oxidation catalyst based on a high-temperature-inflow-condition exhaust gas temperature and a low-temperature-inflow-condition exhaust gas temperature, the high-temperature-inflow-condition exhaust gas temperature being a temperature detected or estimated by the electronic control unit while an inflow exhaust gas temperature, which is a temperature of the exhaust gas that flows into the oxidation catalyst or an inlet temperature of the oxidation catalyst, is in a high temperature region while the reducing agent is supplied from the reducing agent supply device, the low-temperature-inflow-condition exhaust gas temperature being a temperature detected or estimated by the electronic control unit while the inflow exhaust gas temperature is in a low temperature region, in which the inflow exhaust gas temperature is lower than the inflow exhaust gas temperature in the high temperature region, while the reducing agent is supplied from the reducing agent supply device.

2. The catalyst deterioration diagnosis system according to claim 1, wherein an amount of supply of the reducing agent from the reducing agent supply device is controlled based on the inflow exhaust gas temperature.

3. The catalyst deterioration diagnosis system according to claim 1, wherein if the inflow exhaust gas temperature is changed or an amount of supply of the reducing agent from the reducing agent supply device is changed, the electronic control unit performs the diagnosis of deterioration of the oxidation catalyst with the use of the temperature detected or estimated by the electronic control unit after a total amount of air taken in since the inflow exhaust gas temperature or the amount of supply of the reducing agent was changed becomes equal to or greater than a reference value.

4. The catalyst deterioration diagnosis system according to claim 1, wherein if the inflow exhaust gas temperature is changed or an amount of supply of the reducing agent from the reducing agent supply device is changed, the electronic control unit performs the diagnosis of deterioration of the oxidation catalyst with the use of the temperature detected or estimated by the electronic control unit after operating time of an internal combustion engine equipped with the exhaust gas purification device since the inflow exhaust gas temperature or the amount of supply of the reducing agent was changed becomes equal to or greater than a reference time period.

5. The catalyst deterioration diagnosis system according to claim 1, wherein if the inflow exhaust gas temperature is changed or an amount of supply of the reducing agent from the reducing agent supply device is changed, the electronic control unit performs the diagnosis of deterioration of the oxidation catalyst with the use of the temperature detected or estimated by the electronic control unit after a total amount of fuel and the reducing agent supplied since the inflow exhaust gas temperature or the amount of supply of the reducing agent was changed becomes equal to or greater than a reference amount.

6. The catalyst deterioration diagnosis system according to claim 1, wherein a particulate filter is provided downstream of the oxidation catalyst with respect to exhaust gas flow, and the diagnosis of deterioration of the oxidation catalyst performed by the electronic control unit is performed during a process for regenerating the particulate filter.

7. The catalyst deterioration diagnosis system according to claim 1, wherein the electronic control unit performs the diagnosis of deterioration of the oxidation catalyst based on a difference or a ratio between the high-temperature-inflow-condition exhaust gas temperature and the low-temperature-inflow-condition exhaust gas temperature.

8. The catalyst deterioration diagnosis system according to claim 7, wherein the electronic control unit determines that the oxidation catalyst has deteriorated when the difference between the high-temperature-inflow-condition exhaust temperature and the low-temperature-inflow-condition exhaust gas temperature is equal to or greater than a predetermined value or when the ratio of the high-temperature-inflow-condition exhaust gas temperature to the low-temperature-inflow-condition exhaust gas temperature is equal to or higher than a predetermined value.

9. The catalyst deterioration diagnosis system according to claim 1,
wherein the electronic control unit controls the inflow exhaust gas temperature by performing a high temperature keeping process for keeping the inflow exhaust gas temperature within the high temperature region and a low temperature keeping process for keeping the inflow exhaust gas temperature within the low temperature region, and
when the electronic control unit performs the diagnosis of deterioration of the oxidation catalyst, the high temperature keeping process and the low temperature keeping process are consecutively performed.

10. The catalyst deterioration diagnosis system according to claim 9, wherein when the electronic control unit performs the diagnosis of deterioration of the oxidation catalyst, the low temperature keeping process is performed after the high temperature keeping process.

11. The catalyst deterioration diagnosis system according to claim 9, wherein the electronic control unit brings an internal combustion engine that is equipped with the exhaust gas purification device into normal operation as the low temperature keeping process, and when the inflow exhaust gas temperature is not kept within the low temperature region by the normal operation, the electronic control unit performs control to reduce a temperature of the exhaust gas that is discharged from an engine body.

12. The catalyst deterioration diagnosis system according to claim 1, wherein the electronic control unit performs the diagnosis of deterioration of the oxidation catalyst based on a difference or a ratio between a target temperature of the outflow exhaust gas temperature and the high-temperature-inflow-condition exhaust gas temperature and on a difference or a ratio between the target temperature and the low-temperature-inflow-condition exhaust gas temperature.

13. The catalyst deterioration diagnosis system according to claim 12, wherein the electronic control unit determines that the oxidation catalyst has deteriorated when the difference or the ratio between the target temperature and the high-temperature-inflow-condition exhaust gas temperature is greater than the difference or the ratio between the target temperature and the low-temperature-inflow-condition exhaust gas temperature by a predetermined value or more, or when a ratio of the difference or the ratio between the target temperature and the low-temperature-inflow-condition exhaust gas temperature to the difference or the ratio between the target temperature and the high-temperature-inflow-condition exhaust gas temperature is equal to or higher than a predetermined value.

14. The catalyst deterioration diagnosis system according to claim 12, wherein when the high-temperature-inflow-condition exhaust gas temperature and the low-temperature-inflow-condition exhaust gas temperature are detected or estimated by the electronic control unit, the target temperature is kept constant.

15. The catalyst deterioration diagnosis system according to claim 12, wherein an amount of supply of the reducing agent from the reducing agent supply device is controlled based on the inflow exhaust gas temperature and a difference between the target temperature and the outflow exhaust gas temperature.

16. The catalyst deterioration diagnosis system according to claim 15, wherein the amount of supply of the reducing agent from the reducing agent supply device is controlled so that the outflow exhaust gas temperature is brought to the target temperature.

17. A catalyst deterioration diagnosis method for an exhaust gas purification device including an oxidation catalyst that oxidizes a component of an inflow exhaust gas and a reducing agent supply device that supplies a reducing agent into the exhaust gas that flows into the oxidation catalyst, the catalyst deterioration diagnosis method comprising:
supplying the reducing agent from the reducing agent supply device;
detecting or estimating an outflow exhaust gas temperature, which is a temperature of the exhaust gas that flows out of the oxidation catalyst or an outlet temperature of the oxidation catalyst, while an inflow exhaust gas temperature, which is a temperature of the exhaust gas that flows into the oxidation catalyst or an inlet temperature of the oxidation catalyst, is in a high temperature region while the reducing agent is supplied from the reducing agent supply device;
detecting or estimating the outflow exhaust gas temperature while the inflow exhaust gas temperature is in a low temperature region, in which the inflow exhaust gas temperature is lower than the inflow exhaust gas temperature in the high temperature region, while the reducing agent is supplied from the reducing agent supply device; and
performing a diagnosis of deterioration of the oxidation catalyst based on the outflow exhaust gas temperature while the inflow exhaust gas temperature is in the high temperature region and on the outflow exhaust gas temperature while the inflow exhaust gas temperature is in the low temperature region.

* * * * *